Jan. 9, 1962

P. G. S. MERO 3,016,420

RECORDING DEVICE

Filed March 9, 1959

INVENTOR.
PETER G. S. MERO
BY Thomas E. Dorn
ATTY.

United States Patent Office 3,016,420
Patented Jan. 9, 1962

3,016,420

RECORDING DEVICE

Peter G. S. Mero, 830 Mount Pleasant, Winnetka, Ill.

Filed Mar. 9, 1959, Ser. No. 798,267
6 Claims. (Cl. 178—18)

This invention relates to a new and improved recording device. More particularly, the invention relates to a recording device which is suitable for use in a graphic communication system of the kind in which data is transcribed manually at one station of the system and is automatically reproduced at another station. The invention is especially concerned with a mounting device for a pen or stylus which may be utilized in a recording device of this kind.

In a graphic communication system, a message or other data is manually transcribed upon a writing surface at one station of the system and is automatically reproduced at a second or receiver station in the system. In order to transmit the information necessary for reproduction at the receiver, the transmitter must include a suitable apparatus for analyzing movements of the transmitter stylus, pen, or like device. This apparatus develops electrical control signals which are representative of the movements of the stylus or pen. A preferred system of this kind is described in Patent No. 2,583,535 of Robert Adler, issued January 29, 1952, and in Patent No. 2,649,503 of Robert Adler, issued August 18, 1953. The electromechanical translating apparatus employed for this purpose is preferably made relatively light in weight, in order to minimize inertia effects in the system and to permit convenient operation thereof. Moreover, the translating apparatus must be relatively sensitive in operation and therefore requires maximum protection from misuse on the part of the operator.

For effective and efficient operation, it is highly desirable that a recording device employed in a graphic communication system of this kind afford certain operating characteristics, some of which have heretofore appeared to be mutually contradictory and have therefore led to compromises in design, with the result that optimum performance has been difficult to achieve. For example, the recording device may be utilized by a variety of operators, and the mode of operation may vary to a substantial extent. Thus, one operator may hold the stylus or pen at an acute angle with respect to the writing surface, whereas another operator may hold the pen or stylus almost perpendicular with respect to the writing surface. Moreover, an operator cannot normally maintain a constant angular alignment of the pen, relative to the writing surface, during an ordinary writing operation. Consequently, the mounting provided for the pen or stylus must permit almost universal movement of the pen with respect to that surface in order to afford a convenient writing angle for any operator. On the other hand, since the point of support for the pen cannot be located exactly at the writing tip thereof, any mounting arrangement which provides for universal pivotal movement of the stylus or pen introduces a factor of confusion with respect to the position of the stylus upon the writing surface. In previously known devices, it has been difficult to reduce the area of confusion with respect to position of the stylus and at the same time maintain the requisite universality with respect to angular positioning of the stylus.

Another difficulty introduced by the requirement for virtually universal pivotal movement of the stylus with respect to the writing surface relates to disposition of the pen or stylus when it is not in use. Previously known arrangements do not afford a convenient and safe rest position for the pen. Moreover, such mechanical support arrangements may introduce excessive lateral "play" or lost motion into the electromechanical translating linkage, with the result that information transmitted to the receiver may be somewhat ambiguous in nature.

A primary object of the invention, therefore, is to provide a new and improved recording device which permits substantially universal pivotal movement of a recording stylus or pen with respect to a writing surface, yet which substantially avoids the problems and difficulties set forth hereinabove.

A more specific object of the invention is to afford a new and improved mounting arrangement for the stylus in a recording device for a graphic communication system which inherently reduced confusion and ambiguity, in operation of the recording device, to a minimum.

Another object of the invention is to provide a new and improved recording device, comprising a stylus or pen, a support member for the stylus, and a substantially universally pivotal joint connecting the stylus and the support member which may be easily and conveniently engaged with and disengaged from the stylus.

A further object of the invention is to provide a new and improved stylus support device of the universal joint type, suitable for use in the recording apparatus of a graphic communication system, which affords a convenient rest position for the stylus with the stylus supported out of contact with the writing surface.

A specific object of the invention is a new and improved mounting arrangement or linkage, for linking the stylus of a graphic communication system with a support arm, which linkage provides for substantially universal pivotal movement of the stylus with respect to a writing surface and which is effective to minimize lost motion of the stylus with respect to the support arm.

Other and further objects of the present invention will be apparent from the following description and claims and are illustrated in the accompanying drawings which, by way of illustration, show preferred embodiments of the present invention and the principles thereof and what is now considered to be the best mode contemplated for applying those principles. Other embodiments of the invention embodying the same or equivalent principles may be used and structural changes may be made as desired by those skilled in the art without departing from the present invention and the purview of the appended claims.

Figures 1, 2, 3, 4, 5, 6:
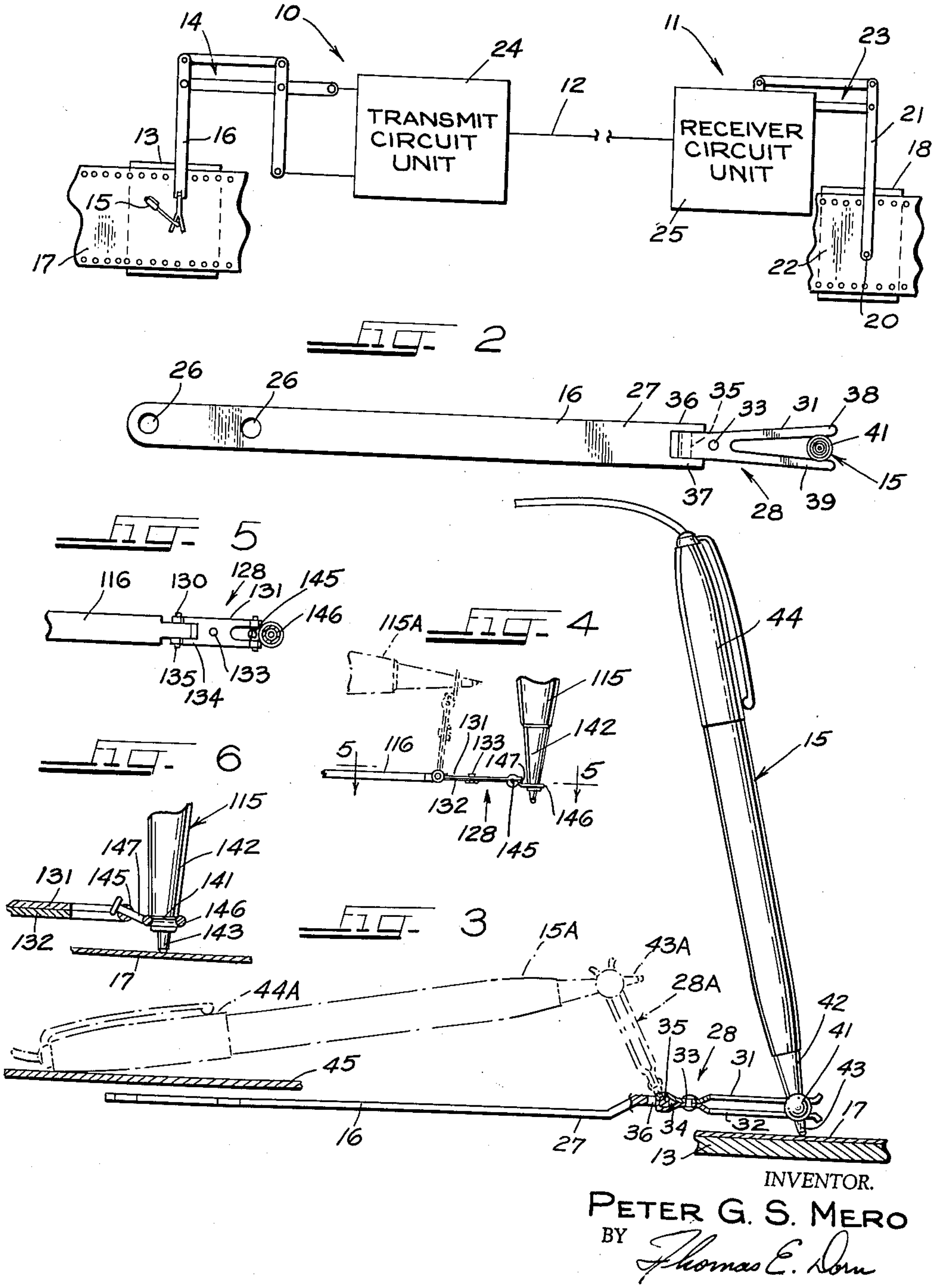
FIG. 1 is a simplified plan view, schematic in form, of a graphic communication system in which the recording device of the invention may be employed.
FIG. 2 is a plan view, partly in cross section, of a recording device constructed in accordance with one embodiment of the invention, and is drawn to a substantially larger scale than FIG. 1.
FIG. 3 is an elevation view of the recording device of FIG. 1, a part of the device being shown in cross section.
FIG. 4 is a detail elevation view, similar to FIG. 3, but illustrating a preferred embodiment of the invention.
FIG. 5 is a plan view, partially in cross section, taken approximately along line 5—5 in FIG. 4.
FIG. 6 is a sectional elevation view showing details of construction in the embodiment of FIGS. 4 and 5.

The graphic communication system illustrated in FIG. 1 comprises two communication stations 10 and 11 which are electrically connected or otherwise coupled to each other as by a transmission line 12. It should be understood that a radio transmission link or other coupling arrangement may be substituted for the transmission line. The station 10, in the illustrated system, is a transmitter, whereas the station 11 is a receiver.

The communication station 10 includes a writing surface or platen 13. A suitable recording medium 17, usually paper, may be disposed upon a writing surface 13.

The station 10 further includes a writing instrument comprising a stylus or pen 15 which is supported upon an arm or link 16. The support link 16 constitutes a part of the transmitter apparatus and preferably comprises one member of a parallel linkage 14 system in a translating apparatus of the kind described in the aforementioned Patent No. 2,583,535 of Robert Adler.

The communication station 11 is, in many respects, essentially similar in construction to station 10, and includes a writing surface 18 bounded by a part of the cabinet 19 of the station. As in the case of the transmitter 10, the writing surface 18 may be utilized to support a suitable recording medium 22 in position to be engaged by a writing head or stylus 20. The stylus 20 is mounted upon a support arm or link 21 which comprises one member of a translating mechanism similar to that utilized at the transmitter 10. The transmitter unit 10 further includes suitable electrical circuits 24 for translating movements of the stylus or pen 15 into electrical control signals which are transmitted over the line 12 or other coupling link to the receiver 11. The receiver 11, on the other hand, includes suitable circuits and devices 25 for moving the stylus 20 into and out of engagement with the recording medium 22 on the writing surface 18 and for moving the stylus 20 transversely of the writing surface to reproduce information thereon in response to the control signals transmitted from the transmitter 10. The electrical circuits and other operating devices for the transmitter and receiver may be of known construction, particularly as described in the aforementioned Adler patents, and therefore need not be set forth specifically herein.

FIGS. 2 and 3 illustrate one embodiment of the invention and show the mounting arrangement by means of which the pen or stylus 15 is secured to the support arm 16. As shown in these figures, the arm 16 preferably comprises a relatively thin lightweight metal member which extends out over the writing surface 13, and thus over the recording medium 17 supported thereon. At one end, the arm 16 is provided with suitable apertures or other means 26 for securing the arm to the translating linkage 14, as noted hereinabove. At the opposite end 27 of the arm 16 a stylus mounting linkage 28, which constitutes a cantilever extension of the arm, is mounted thereon.

The stylus mounting linkage 28 comprises a pair of bifurcated cantilever support members 31 and 32 which are complementary in configuration to each other and which are joined together by suitable means such as a rivet 33. At the end of the links 31 and 32 adjacent the support arm 16, the links are bent to form a bearing opening 34 (see FIG. 3). The support arm 16, on the other hand, is provided with an axle or bearing portion 35 which extends across the front end of the support arm between a pair of ears or shoulder members 36 and 37. It is thus seen that the links 31 and 32 are pivotally movable relative to the bearing member 35 on the support arm. On the other hand, lateral movement of the two links with respect to the support arm is effectively prevented by the engagement of the links with the shoulders 36 and 37.

At the end of the support member or link 31 opposite the arm 16, the inner surface of each of the bifurcated portions 38 and 39 of the link is provided with an arcuate recess. Similar recesses are formed in the lower link 32. These recessed portions in the bifurcated links form a cage or socket for receiving a ball member 41 which is mounted upon the end portion 42 of the stylus 15. Preferably, the ball 41 is mounted very close to the writing point or tip 43 of the stylus. To mount the stylus in the linkage 28, it is only necessary to exert a relatively small pressure upon the stylus, forcing the ball 41 inwardly of the open end portions of the link members 31 and 32 and into the cage or socket defined by the recesses in the link members.

When the stylus 15 is mounted in the linkage 28, as best illustrated in FIG. 3, the stylus may be tipped to any desired writing angle with respect to the support arm 16, since the ball and socket joint formed by the recesses in the members 31 and 32 and the ball member 41 permits movement of the stylus to virtually any desired angle relative to the links 31 and 32. The stylus may be moved into contact and out of contact with the paper or other recording medium 17 on the writing surface 13 by pivoting the linkage 28 about the axle 35 on the support arm. Thus, it is not necessary to move the support arm 16 in a vertical direction when the stylus is elevated above the writing surface, as when a space occurs between words in a written message, or in other similar circumstances.

Because the ball 41 is located very closely adjacent the writing tip 43 of the stylus 15, pivotal movement of the stylus relative to the support arm 16 and the writing surface 13 results in only a small displacement of the writing tip upon the recording medium 17. Consequently, this displacement, which is a possible source of ambiguity in operation of the connection system, is effectively minimized. On the other hand, the engagement of the links 31 and 32 with the shoulders 36 and 37 on the stylus end 27 of the support arm prevents pivotal movement of the support linkage in a horizontal direction relative to the support arm. Accordingly, there is little possibility that ambiguous or erroneous operation of the system can arise from this source, as compared with previously known arrangements. Stated differently, the described linkage permits movement of the two cantilever links 31 and 32 in a direction toward and away from the recording medium, but effectively prevents movement of the cantilever members, and hence the stylus, with respect to the support arm 16, in a direction parallel to the recording medium.

The stylus mounting arrangement of the invention also affords a convenient rest position for supporting the stylus 15 out of contact with the paper or other recording medium 17. Thus, and as illustrated in FIG. 3, the pen or stylus 15 may be moved to a position in which the upper end 44 thereof rests upon a part of the cabinet 45 of the transmitting unit 10, as indicated by the dash outline 44A. When the pen or stylus is lowered to this position, the linkage 28 is pivoted about the axle 35 to the position indicated by the dash outline 28A, and holds the pen in a rest position 15A with the tip or writing point of the pen disposed well above the writing surface 13 as indicated at 43A. Consequently, despite the universal pivotal mounting of the stylus 15 in the linkage 28A, a convenient and effective rest position is provided for the stylus.

FIGS. 4, 5 and 6 show a preferred embodiment of the invention, in which the stylus mounting linkage is constructed somewhat differently from that described hereinabove. The recording device shown in these figures comprises a support arm 116 which is substantially similar to the arm 16 and which may be included in a motion-translating linkage such as the linkage 14 (see FIG. 1). At the forward or right hand end of the support arm 116, as seen in FIGS. 5 and 6, the support arm is provided with a pair of bearing or axle members 130 and 135 which project outwardly of the support arm and which are utilized to afford a pivotal support for a stylus mounting linkage 128.

The stylus support linkage 128 includes a pair of complementary links or support members 131 and 132 which are secure to each other by suitable means such as a rivet, screw, or the like as indicated by the reference numeral 133. The ends of each of the links 131 and 132 are bifurcated, as shown in FIG. 5. The one end 134 of each of the links is bent to afford a bearing portion engaging the two axle members 130 and 135. The opposite end of each of the links is similarly bent to afford bearing portions encompassing the ends of a pivot pin or axle member 145. The central portion of the axle member 145 is provided with shoulders which engage the bearing portions on the link members 131 and 132, thereby preventing pivotal movement of the axle member about a vertical axis with respect to the links 131 and 132. However, the axle member 145 is freely rotatable about a horizontal axis relative to the two links 131 and 132.

The lower or writing end 142 of the stylus 115 is provided with an annular groove 141, as best illustrated in FIG. 6. The groove portion 141 of the stylus engages and interlocks with a loop or ring 146, which is provided with an extension portion 147. The extension portion 147 of the loop 146 is journalled in a suitable aperture in the axle member 145, and one end of the extension portion is capped or enlarged, as indicated by reference numeral 148, to hold the loop in mounted position on the axle. The size of the loop 146 is not particularly critical, although it must be matched relatively closely to the size and configuration of the groove 141. The loop 146 may be formed from conventional wire stock, bent to form the desired annular portion for engaging in the groove 141 and further to provide the extension portion 147 projecting therefrom. Preferably, the groove 141 is located as closely as possible to the writing tip 143 of the stylus 115.

The operation of the embodiment of FIGS. 4–6 is substantially similar to that of FIGS. 2 and 3. With the stylus 115 mounted in the illustrated operating position, the stylus may be pivoted to any desired writing angle with respect to the linkage 128, since the loop extension 147 provides for rotational movement about one axis and the axle 145 permits rotational movement about a coordinate axis. Because these axes are located very close to the writing tip 143 of the stylus 115, any error in operation of the recording device which might arise by virtue of this pivotal movement is effectively minimized. The linkage 128 also provides for vertical movement of the stylus about a horizontal axis defined by the two axle members 130 and 135, so that the stylus may be moved into contact with or elevated from the writing surface of the recording system transmitter in which it is employed. On the other hand, the mounting of the linkage is such that it cannot be pivoted about a vertical axis with respect to the support arm 116, thereby effectively preventing errors which would otherwise arise in the operation of the device.

The linkage 128 also permits movement of the stylus 115 to a rest position in which the stylus is supported above its associated writing surface, as generally indicated by the dash outline 115A in FIG. 4. Thus, and like the embodiment of FIGS. 2 and 3, a convenient rest position is provided for the pen despite the fact that a universal coupling is provided between the pen and the support arm. The construction illustrated in FIGS. 4–6 is no more expensive than that of FIGS. 2 and 3, and provides somewhat better control of manufacturing tolerances because it eliminates entirely the ball member 41. Moreover, mounting of the stylus in the support linkage 128 is relatively simple and convenient, since it is only necessary to exert a relatively small force on the stylus to force it through the link or loop 146 and thereby bring the loop into engagement with the groove 141.

Hence, while I have illustrated and described the preferred embodiments of my invention, it is to be understood that these are capable of variation and modification, and I therefore do not wish to be limited to the precise details set forth, but desire to avail myself of such changes and alterations as fall within the purview of the following claims.

I claim:

1. A recording device for a graphic communication system transmitter including a writing surface, disposed in a predetermined plane, and a signal-translating apparatus, said recording device comprising: a stylus member having a size and configuration suitable for use as a manual recording instrument and having a recording tip at one end thereof for engaging said writing surface; a support arm for connecting said stylus member to said signal-translating apparatus; and means for connecting said stylus member to said support arm, said means comprising a support link connected at one end to said support arm for free pivotal movement through an angle of at least 90° relative thereto about an axis parallel to said writing surface, and a universal joint connecting the opposite end of said support link to said stylus member closely adjacent the recording tip thereof, said support link and said support arm conjointly providing a prop for supporting said recording tip of said stylus member in a rest position with both said tip and said link out of contact with said writing surface.

2. A recording device for a graphic communication system transmitter including a writing surface, disposed in a predetermined plane, and a signal-translating apparatus, said recording device comprising: a stylus member having a size and configuration suitable for use as a manual recording instrument and having a recording tip at one end thereof for engaging said writing surface; a support arm, disposed in a plane substantially parallel to the plane of said writing surface, for connecting said stylus member to said signal-translating apparatus; and means for connecting said stylus member to said support arm, said means comprising a support link connected at one end to said support arm for free pivotal movement through an angle of at least 90° relative thereto about an axis parallel to said writing surface, means for preventing pivotal movement of said support link about an axis normal to said writing surface, and a universal joint connecting the opposite end of said support link to said stylus member closely adjacent the recording tip thereof, said support link and said support arm conjointly providing a prop for supporting said recording tip of said stylus member in a rest position with both said tip and said link out of contact with said writing surface.

3. A recording device for a graphic communication system transmitter including a writing surface, disposed in a predetermined plane, and a signal-translating apparatus, said recording device comprising: a stylus member, having a size and configuration suitable for use as a manual recording instrument, including a recording tip at one end thereof for engaging said writing surface, said stylus member having a peripheral groove therein closely adjacent said recording tip; a support arm for connecting said stylus member to said signal-translating apparatus; and means for connecting said stylus member to said support arm, said means comprising a support link connected at one end to said support arm for free pivotal movement through an angle of at least 90° relative thereto about an axis parallel to said writing surface, and a universal joint connecting the opposite end of said support link to said stylus member closely adjacent the recording tip thereof, said universal joint comprising a wire ring engaged in said stylus groove, said support link and said support arm conjointly providing a prop for supporting said recording tip of said stylus member in a rest position with both said tip and said link out of contact with said writing surface.

4. A recording device for a graphic communication system transmitter including a writing surface, disposed in a predetermined plane, and a signal-translating apparatus, said recording device comprising: a stylus member, having a size and configuration suitable for use as a manual recording instrument, including a recording tip at one end thereof for engaging said writing surface and having a peripheral groove closely adjacent said writing tip; a support arm for connecting said stylus member to said signal-translating apparatus; and means for connecting said stylus member to said support arm, said means comprising a support link connected at one end to said support arm for free pivotal movement through an angle of at least 90° relative thereto about an axis parallel to said writing surface, and a universal joint connecting the opposite end of said support link to said stylus member closely adjacent the recording tip thereof, said universal joint comprising a wire loop engaged in said stylus groove, an axle member journalled in said opposite end of said support link, and an extension portion on said wire loop extending through an aperture in said axle member in a direction approximately normal to the axis of said axle member, said support link and said support arm conjointly providing a prop for supporting said recording tip of said stylus member in a rest position, with both said tip and said link out of contact with said writing surface, when pivoted away from said writing surface.

5. In a transmitter unit for a graphic communication system of the kind in which movements of a marking stylus across a recording medium are translated into electrical signals utilized to control similar movements of a second stylus at a remote station, a stylus support assembly comprising: a stylus support arm supported for movement relative to the recording medium; a pair of bifurcated cantilever support links mounted upon said support arm and spaced from each other in a direction substantially normal to said recording medium, the inner surface of each the bifurcated portions of said cantilever links having an arcuate recess therein, said recesses conjointly defining a socket for a ball-and-socket joint; a stylus member, including a ball mounted closely adjacent the writing end thereof, said ball being removably insertable into the open ends of the bifurcated portions of said cantilever links to complete a ball and socket joint supporting said stylus in universal pivotal relation to said cantilever links; and means for mounting said cantilever members upon said support arm for free pivotal movement through an angle of at least 90° with respect thereto in a direction away from said recording medium but effectively preventing movement of said cantilever members, with respect to said support arm, in a direction parallel to said recording medium.

6. In a transmitter unit for a graphic communication system of the kind in which movements of a stylus across a recording medium are translated into electrical signals utilized to control similar movements of a second stylus at a remote station, a stylus support assembly comprising: a stylus support arm supported for movement in a direction parallel to the recording medium; a pair of bifurcated cantilever support members mounted upon said support arm and extending thereof substantially parallel to said recording medium and spaced from each other in a direction normal to said recording medium, the inner surfaces of each the bifurcated portions of said cantilever members having an arcuate recess therein, said recesses conjointly defining a socket for a ball-and-socket joint; a stylus having a ball mounted closely adjacent the writing tip thereof, said ball being removably insertable into the bifurcated portions of said cantilever members to complete a ball and socket joint supporting said stylus in free pivotal relation to said cantilever members; and means for mounting said cantilever members upon said support arm for conjoint pivotal movement through an angle of at least 90° with respect thereto in a direction away from said recording medium but effectively preventing movement of said cantilever members, with respect to said support arm, in a direction parallel to said recording medium.

References Cited in the file of this patent

UNITED STATES PATENTS

| | | |
|---|---|---|
| 672,631 | Tiffany | Apr. 23, 1901 |
| 2,484,298 | Krahulec | Oct. 11, 1949 |
| 2,847,502 | Rabinow | Aug. 12, 1958 |
| 2,891,107 | Weingart | June 16, 1959 |

FOREIGN PATENTS

| | | |
|---|---|---|
| 447,547 | Great Britain | May 21, 1936 |